United States Patent
Becker

(10) Patent No.: US 7,138,882 B2
(45) Date of Patent: Nov. 21, 2006

(54) ARCHITECTURE FOR UNIVERSAL MODULATOR

(76) Inventor: James C. Becker, 1632 Flower Ave., Torrance, CA (US) 90503

( * ) Notice: Subject to any disclaimer, the term of this patent is extended or adjusted under 35 U.S.C. 154(b) by 721 days.

(21) Appl. No.: 10/291,159

(22) Filed: Nov. 8, 2002

(65) Prior Publication Data
US 2004/0091060 A1   May 13, 2004

(51) Int. Cl.
*H03C 3/00* (2006.01)

(52) U.S. Cl. .................................................. 332/103

(58) Field of Classification Search ........ 332/103–105; 375/298, 308
See application file for complete search history.

(56) References Cited

U.S. PATENT DOCUMENTS

| | | |
|---|---|---|
| 3,805,191 A | 4/1974 | Kawai |
| 4,084,137 A | 4/1978 | Welti |
| 5,307,377 A | 4/1994 | Chouly et al. |
| 5,343,499 A | 8/1994 | Jasper et al. |
| 5,363,408 A | 11/1994 | Paik et al. |
| 5,440,259 A | 8/1995 | Yokomura |
| 5,440,268 A | 8/1995 | Taga et al. |
| 5,485,489 A | 1/1996 | Chiba |
| 5,500,876 A | 3/1996 | Nagata |
| 5,504,465 A | 4/1996 | Yung et al. |
| 5,534,828 A | 7/1996 | Okada et al. |
| 5,550,868 A | 8/1996 | Boccuzzi |
| 5,598,441 A | 1/1997 | Kroeger et al. |
| 5,612,651 A | 3/1997 | Chethik |
| 5,615,230 A | 3/1997 | Gunther et al. |
| 5,648,985 A | 7/1997 | Bjerede et al. |
| 5,668,795 A * | 9/1997 | Magill et al. ............... 370/209 |
| 6,031,865 A * | 2/2000 | Kelton et al. ............... 375/130 |
| 6,434,189 B1 | 8/2002 | Murphy |
| 2004/0021523 A1 | 2/2004 | Sadowy et al. |

OTHER PUBLICATIONS

Verdot, Leclert: "Universal High Bit Rate Modem for Digital Radio Systems" IEEE International Conference on Communications, Jun. 13, 1982, pp. 38.1.1-38.1.4 XP000794171 NY USA.

* cited by examiner

*Primary Examiner*—David Mis

(57) ABSTRACT

A universal modulator architecture for generating various band efficient waveforms, such as QPSK 8 PSK, 16 PSK, 16 QAM, 12/4 QAM, 32 QAM and 64 QAM and higher. The modulator includes one or more biphase modulators coupled to one or more QPSK modulators. Each of the bi-phase modulators includes a pair of switchable attenuators for varying the degree of phase shift of the symbols to form the various constellations for the 8 PSK, 16 PSK, 16 QAM 12/4 QAM, 32 QAM and 64 QAM and higher signals. The architecture is expandable to generate higher order modulation formats, such as 256 QAM, 512 QAM and 1024 QAM and above. The architecture is also expandable to support non-linear predistortion.

31 Claims, 7 Drawing Sheets

ARCHITECTURE FOR UNIVERSAL MODULATOR

BACKGROUND OF THE INVENTION

1. Field of the Invention

The present invention relates to a modulation apparatus and more particularly to a universal modulator architecture for generating various band efficient signals, such as 8 PSK, 16 PSK, 16 QAM, 32 QAM, 64 QAM and 12/4 QAM.

2. Description of the Prior Art

Bandwidth efficiency is important in digital communication systems. It is the ratio of the rate of information transmission to the bandwidth required for the system to operate properly. The increasing demand for information transmission and limited resource of bandwidth allocations has focused interest on communications systems offering a high level of bandwidth efficiency.

Digital communication systems typically operate by sending symbols between a transmitter and a receiver selected from a predetermined alphabet of symbols, where each symbol represents some number of information bits. The required bandwidth is related to the rate of symbol transmission is typically expressed in terms of number of symbols per second. A strategy for increasing the bandwidth efficiency of a digital communication system is to use a larger alphabet of symbols where each symbol represents more information bits.

For example, in a simple biphase shift keyed system, an alphabet of two symbols is used. Each symbol represents a single bit (1 or 0). The phase of a constant amplitude carrier signal is shifted by 0° or 180° to represent each of the two symbols. Each symbol is represented by a dot as shown in FIG. 1a.

Increasing the alphabet of transmitted symbols to four allows two bits of digital information to be transmitted on each symbol. This is referred to as quadraphase shift keying (QPSK). The carrier is transmitted at one of four possible phases, separated by 90°, to represent each symbol as illustrated in FIG. 1b. Such QPSK modulation techniques are known in the art and described in U.S. Pat. Nos. 5,440,259; 5,615,230; 5,440,268; 5,550,868; 5,598,441; 5,500,876 and 5,485,489, hereby incorporated by reference.

This may be extended to 8 PSK and 16 PSK, where an alphabet of eight or sixteen symbols represent three or four bits of digital information. The carrier is then transmitted at one of eight or sixteen phases separated by 45° or 22.5°, for example as shown in FIGS. 1c and 1d. Note that in all the above cases the amplitude (distance to the origin on the plot) is constant for all symbols.

The reduced angular separation of transmitted symbols increases the likelihood of erroneous symbol decisions in the receiver resulting in information bit transmission errors. This limits the usefulness of larger alphabets of PSK symbols.

By varying the amplitude in addition to the phase of a carrier, the communication system may operate with a larger symbol alphabet while preserving the separation of symbols in the receiver. A modulation format that exploits this is known as quadrature amplitude modulation (QAM) is illustrated in FIGS. 1e–1g. 16 QAM, 32 QAM and 64 QAM transmit four, five and six bits of information with each symbol respectively. Note that multiple amplitudes and phases differentiate the symbols. Such QAM modulation techniques are relatively well known in the art. Example of such QAM modulation techniques are discussed in U.S. Pat. Nos. 5,612,651; 5,343,499; 5,363,408 and 5,307,377, hereby incorporated by reference.

FIG. 1h illustrates 12/4 QAM which is a special case of 16 QAM. Only two values of amplitude are used for 12/4 QAM as compared with three for 16 QAM. The lower amplitude symbols are separated by 90° and the larger amplitude symbols are separated by 30°. 12/4 QAM is a desirable alternative to 16 QAM because it makes more efficient use of limited transmitter power.

The modulators for generating bandwidth efficient signals, such as QPSK and QAM signals are relatively complex. Serial modulators are known for generating PSK waveforms. However, such serial modulators do not have the capability for amplitude modulation and thus cannot be used in QAM applications. Parallel modulators are also known that are adapted to provide both phase and amplitude modulation, making such modulators suitable for both QPSK and QAM applications. However, the complexity and critical alignment of such parallel modulators make such modulators relatively expensive. A digital vector modulator is also known which overcomes many of the problems mentioned above. However, such digital vector modulators are only suitable for use at lower data rate applications.

In order to obviate the need for different modulators for different modulating techniques, a universal architecture for a modulator is disclosed in U.S. Pat. No. 5,648,985. In particular, the '985 patent discloses a universal architecture for generating both QAM and PSK signals. Unfortunately, such a universal modulator is not suitable and cannot be used for other band efficient modulation techniques, such as FSK.

SUMMARY OF THE INVENTION

It is an object of the present invention to solve various problems in the prior art.

It is yet another object of the present invention to provide a modulator for generating band efficient waveforms which can be used in various PSK and QAM applications.

It is also an object of the invention to provide a relatively simple modulator for generating 12/4 QAM waveforms.

Briefly the present invention relates to a band efficient modulation apparatus for generating various band efficient signals, such as QPSK, 8 PSK, 16 PSK, 16 QAM, 32 QAM, 64 QAM and 12/4 QAM. The universal modulator architecture includes one or more QPSK phase modulators, which, in turn, are serially connected to one or more biphase modulators. Each of the biphase modulators includes a pair of switchable attenuators for varying the amount of phase shift. In configurations utilizing a plurality of QPSK modulators such modulators are coupled in parallel to provide QAM symbols of varying phase and amplitude for constellations, such as QPSK, 16 PSK and 32 PSK. In embodiments utilizing a plurality of biphase modulators, the biphase modulators are serially coupled together. Operation of the serial connected biphase modulators in conjunction with the parallel connected QPSK modulation provides symbols of varying phase and amplitude for additional constellations such as 8 PSK, 16 PSK and 12/4 QAM. The architecture is expandable to generate higher order modulation formats such as 256 QAM, 512 QAM and 1024 QAM. The architecture is also expandable to support non-linear predistortion. The parallel connected QPSK modulators provide symbols of varying phase and amplitude for constellations such as QPSK, 16 PSK and 32 PSK. Operation of the serial connected biphase modulators in conjunction with the parallel connected QPSK modulators provides symbols of varying phase and amplitude for additional constellations such as 8 PSK 16 PSK and 12/4 QAM.

DESCRIPTION OF THE DRAWINGS

These and other objects of the present invention will be readily understood with reference to the following specification and attached drawing wherein.

DETAILED DESCRIPTION

Figure 3:
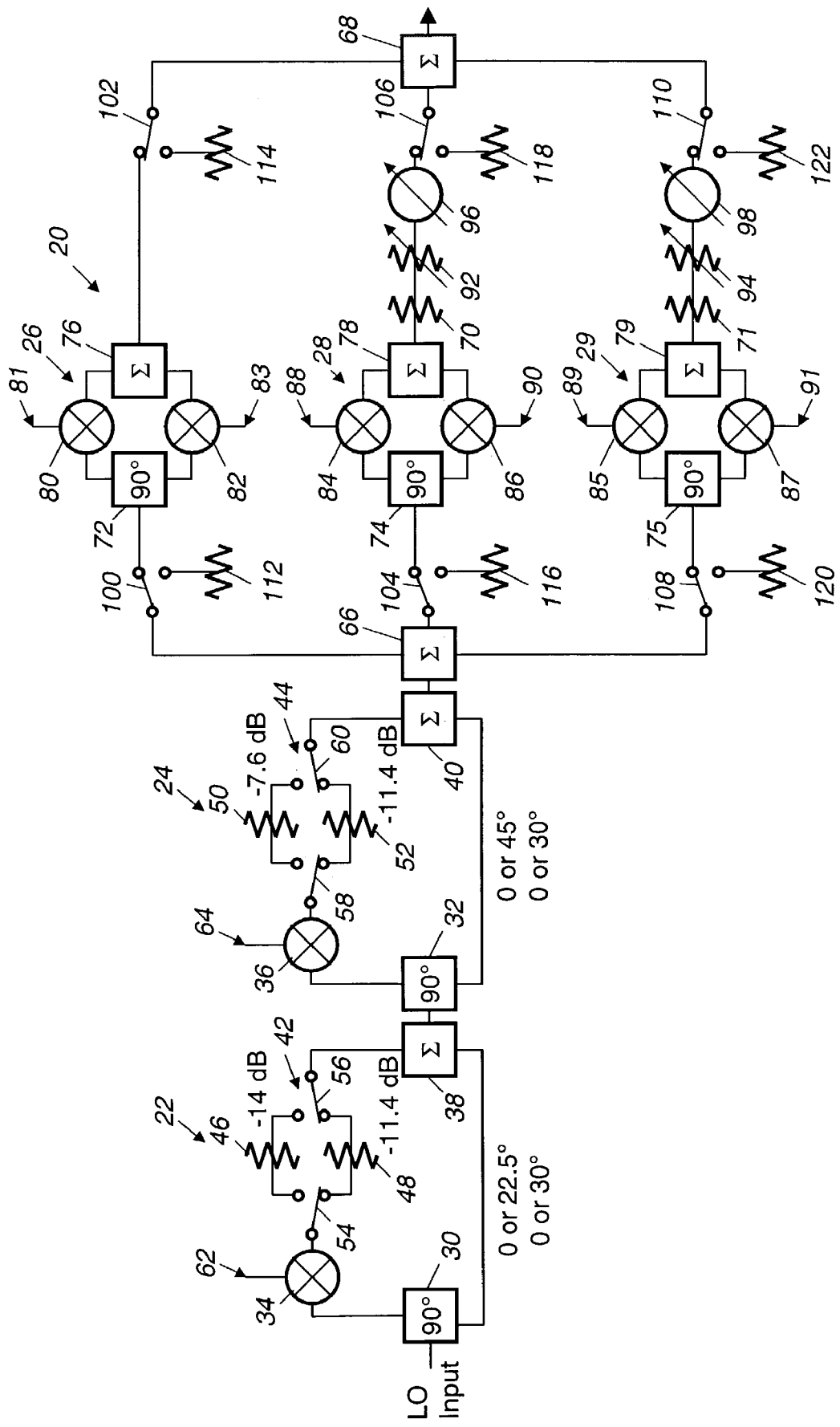
FIG. 3 is a detailed block diagram of a universal modulator in accordance with the present invention.

The present invention relates to a universal modulator for generating various band efficient signals, such as QPSK, 8 PSK, 16 PSK, 16 QAM, 32 QAM, 64 QAM and 12/4 QAM signals. The universal modulator, generally identified with the reference numeral 20, includes one, two or more serially coupled biphase modulators 22 and 24 and one, two or more parallel connected QPSK modulators 26, 28 and 29. Each of the biphase modulators 22 and 24 includes a 90° phase shifting device 30, 32, a mixer 34, 36, a summing junction 38, 40 and an attenuator circuit 42, 44. Each attenuator circuit 42 and 44 includes a pair of attenuators 46, 48 and 50, 52, selected by way of a pair of single pole double throw switches 54, 56 and 58, 60 for selectively varying the phases of the symbols forming the constellation. The value of the attenuators 46, 48, 50 and 52 is selected to provide a 22.5°, 30°, or 45° phase shifts. In particular, when the switches are configured as illustrated in FIG. 3, the first series modulator 22 will provide a 0° or 30° phase shift while the second modulator will also provide an additional 0° or 30° phase shift for a total phase shift of 0°, 30°, 60° or 90°. When the switches 54, 56, 58 and 60 are in a position opposite to that shown in FIG. 3, the attenuator values have been selected to provide a total phase shift of 0°, 22.5°, 45° or 67.5°.

A local oscillator (LO) input is applied to the first biphase modulator 22. The local oscillator input LO is preferably a sinewave. A pair of inputs 62 and 64 to the mixers 34 and 36 are used to control the series modulators 22 and 24. The inputs 62 and 64 may be digital inputs (i.e. logical 1 and 0 which corresponds to +V and −V respectively).

When a logical 0 is applied to the input 62 of the mixer 34, the phase of the signal at the output of biphase modulator 22 remains unchanged. However, when a logical 1 is applied to the input 62 of the mixer 34, the phase of the output of the biphase modulator 22 is shifted by 30°, when switches 54 and 56 are in the position as shown in FIG. 3. Application of a logical 1 to the input 62 of the mixer 34 results in a 22.5° phase shift when the switches 54 and 56 are in the opposite position to that shown in FIG. 3. The biphase modulator 24 operates in a similar fashion to the biphase modulator 22 by shifting the phase of its output by either 0° or 30°, when the switches 58 and 60 are in the position shown in FIG. 2. The value of attenuator 50 is selected such that when the switches 58 and 60 are in the opposite position to that shown, the biphase modulator 24 shifts the phase of its output by 0° or 22.5° upon application of a logical 0 or 1 to the input 64 to the mixer 36.

The series connection of the biphase modulators 22 and 24 results in a total phase shift of the input LO signal equal to the sum of the phase shift at each section. A total phase shift of 0°, 30°, or 60° may be programmed by application of the correct logic levels at the inputs 62 and 64, when the switches 54, 56, 58 and 60 are in the position shown in FIG. 3. When the switches 54, 56, 58 and 60 are in the opposite to that shown in FIG. 3, a total phase shift of 0°, 22.5°, 45° or 67.5° may be programmed.

The QPSK modulators 26, 28 and 29 are connected in parallel by way of a pair of summing junctions 66 and 68. The QPSK modulators 26, 28 and 29 are serially connected to the biphase modulators 22 and 24 by way of connecting the output of the summing junction 40 to the input of the summing junction 66. The summing junction 68 forms the output of the universal modulator 20 in accordance with the present invention.

Each QPSK modulator 26, 28 and 29 has the capability to shift the phase of an input sinusoidal LO signal by 45°, 135°, 225° or 315°. Each QPSK modulator 26, 28 and 29 includes a 90° phase shifting device 72, 74, 75, a summing junction 76, 78, 79 and a pair of mixers 80, 82, 84, 85, 86 and 87. Three pairs of digital inputs 81, 83, 88, 90 and 89 and 91 applied to the mixers 80, 82 and 84, 86 and 85, 87 respectively, in order to select one of the four possible phase shifts (45°, 135°, 225°, 315°) of QPSK modulators 26, 28 and 29.

The degree of phase shift is controlled by application of a combination at logical 1 or 0 signals to the mixer inputs, for example 81 and 83 for the QPSK modulator 26, 88 and 90 for the QPSK modulator 28 and 89 and 91 for the QPSK modulator 89.

Figure 2A:
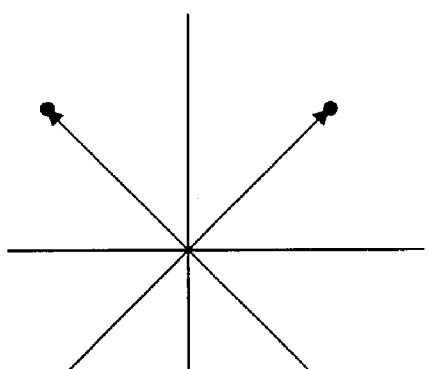
FIG. 2a is a constellation diagram of the output of a QPSK modulator.

Each of the QPSK modulators 26, 28 and 29 produces a constellation as illustrated in FIG. 2*a* which is a typical constellation for a QPSK modulator. The three QPSK modulators, 26, 28 and 29 each receive input LO signals of equal phase and amplitude from the summing junction 66. A fixed attenuator 70, for example a 6 dB attenuator, a variable attenuator 92 and a variable phase shifter 96, may be connected between the output summing junction 68 and the QPSK modulator 28. A fixed attenuator 71, for example, a 12 dB attenuator, a variable attenuator 94 and variable phase shifter 98 maybe connected between the output summing junction 68 and the QPSK modulator 29. A plurality of single throw double pole switches 100, 102, 104, 106, 108 and 110 enable each of the QPSK modulators 26, 28 and 29 to be deactivated from the universal modulator circuit 20 in cases where all three QPSK modulators are not required to generate a given modulation format. Switch positions illustrated in FIG. 3 show all three QPSK modulators 26, 28 and 29 active. A plurality of double pole single throw (DPST) switches 100, 102, 104, 106, 108 and 110 are also connected to a plurality of terminations 112, 114, 116, 118, 120 and 122 so that a controlled impedance is always presented to the summing junctions 66 and 68 when one or more QPSK modulators 26, 28 and 29 are not active.

Figure 2B:
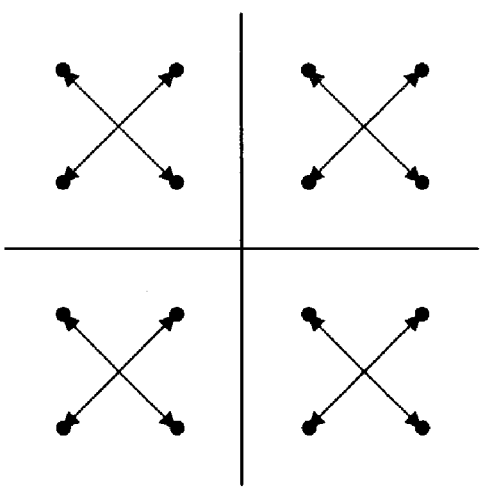
FIG. 2b is the constellation diagram for the sum of the outputs of two QPSK modulators when one modulator output is attenuated 6 dB prior to summation.

As mentioned above, the universal modulator 20 is adapted to provide QPSK, 8 PSK, 16 PSK, 16 QAM and 12/4 QAM constellations. In a first mode of operation, the universal modulator 20 may be configured to generate a QPSK modulation constellation as shown in FIG. 2*a* by activating only the QPSK modulator section 26. In this case DPDT switches 100 and 102 are as illustrated and switches 104, 106, 108 and 110 are in opposite position as illustrated in FIG. 3. The data signal to be modulated and the LO signal is applied to the QPSK modulator 26 inputs 81 and 83. The position of the switches 54, 56, 58 and 60 of the bi-phase modulators 22 and 24 is irrelevant to the QPSK mode of operation of the universal modulator. The data inputs 62 and 64 of the bi-phase modulators 22 and 24 must remain static for QPSK mode operation. In a second mode of operation with the switches 100, 102, 104 and 106 configured as illustrated in FIG. 3, and switches 108 and 110 in the opposite position, the QPSK modulator 29 is inactive in this mode, and as such a 16 QAM modulator may be formed by applying logical zeros to the inputs 62 and 64 of the series modulators 22 and 24. The position of the switches 54, 56, 58 and 60 is irrelevant to the 16 QAM mode of operation of the universal modulator. In such a mode, each of the QPSK modulators 26 and 28 is adapted to provide symbols at 45°, 135°, 225° and 315°. By attenuating the output of the QPSK modulator 28 by 6 db and adding it to the output of the QPSK modulator 26, a 16 QAM modulator constellation is formed as illustrated in FIG. 2*b*.

The data to be modulated onto the carrier is applied to the data inputs 84, 81, 83, and 90 of QPSK modulators 26 and 28. The data inputs 62 and 64 of the biphase modulators 22 and 24 must remain static.

Figure 2C:
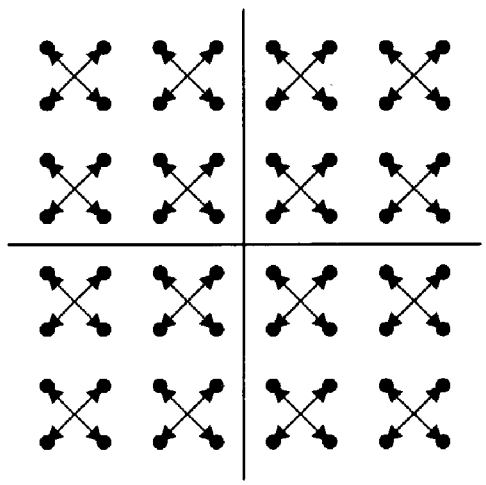
FIG. 2c is the constellation diagram for the sum of the outputs of three QPSK modulators where one is attenuated by 6 dB and another one is attenuated by 12 dB prior to summation.
Figure 2D:
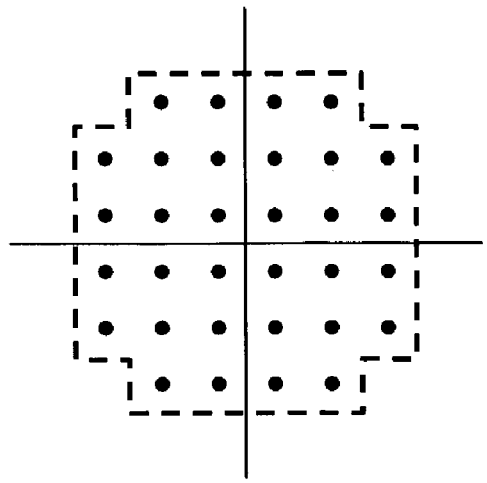
FIG. 2d illustrates that the 32 QAM constellation is a subset of the 64 QAM constellation.

In a third mode of operation, with switches 100, 102, 104, 106, 108 and 110 configured as illustrated as shown in FIG. 3, a 64 QAM modulator may be formed by applying logical zeros to the inputs 62 and 64 of the series modulators 22 and 24. The position of the switches 54, 56, 58 and 60 is irrelevant to the 64 QAM or 32 QAM mode of operation of the universal modulator. In such a mode, each of the QPSK modulators 26, 28 and 29 is adapted to provide symbols at 45°, 135°, 225° and 315°. By attenuating the output of the QPSK modulator 26 by 6 dB and the output of the QPSK modulator 29 by 12 dB and adding these attenuated signals to the output of QPSK modulator 26, a 64 QAM modulator constellation is formed as illustrated in FIG. 2*c*. The data to be modulated onto the carrier is applied to the data inputs 81, 83, 88, 90, 89 and 91 of the QPSK modulators 26, 28 and 29. The data inputs 62 and 64 of the biphase modulators 22 and 24 must remain static. The 32 QAM constellation is a subset of the 64 QAM constellation where the outermost 32 points have been deleted for example, as shown in FIG. 2*d*. Logical constraints placed upon the data inputs 81, 83, 88, 90, 89 and 91 of the QPSK modulators 26, 28 and 29 avoid the-outermost constellation points and thus will result in the generation of a 32 QAM modulation format constellation.

Figure 1A:
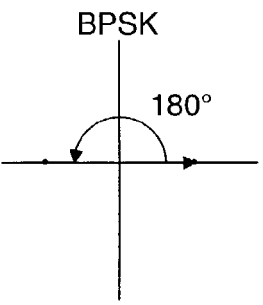
FIG. 1a is constellation diagram of a BPSK modulated signal.
Figure 1B:
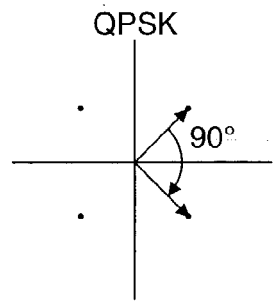
FIG. 1b is constellation diagram of a QPSK modulated signal.
Figure 1C:
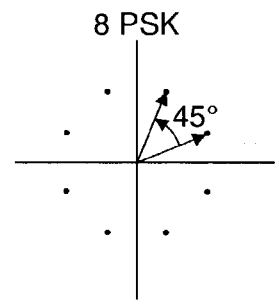
FIG. 1c is constellation diagram of a 8 PSK modulated signal.
Figure 1D:
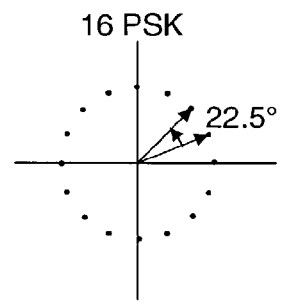
FIG. 1d is constellation diagram of a 16 PSK modulated signal.
Figure 1E:
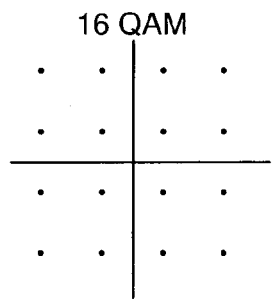
FIG. 1e is constellation diagram of a 16 QAM modulated signal.
Figure 1F:
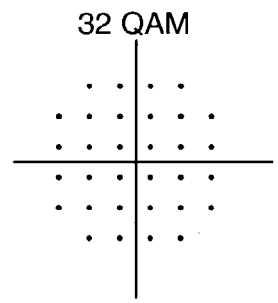
FIG. 1f is constellation diagram of a 32 QAM modulated signal.
Figure 1G:
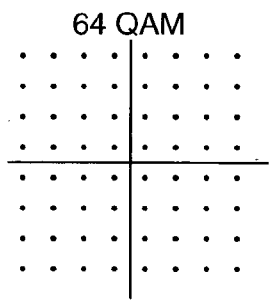
FIG. 1g is constellation diagram of a 64 QAM modulated signal.

In order to generate 8 PSK and 16 PSK constellations, the switches 100 and 102 are configured as shown in FIG. 3 while the switches 54, 56, 58, 60, 104, 106, 108 and 110 are configured in the opposite position to that shown in FIG. 3. Such a configuration disables the QPSK modulators 28 and 29 and sets the bi-base modulator 22 for 0° or 22.5° and the bi-phase modulator 24 for 0° or 45° phase modulation. The data to be modulated onto the carrier is applied to QPSK modulator 20 inputs 81 and 83, bi-phase modulators 22 and 24 inputs 62 and 64. In this mode of operation, the QPSK modulator 20 generates four possible carrier phases separated by 90° each, as shown in FIG. 2*a*. The phase of each point may be rotated by an additional 22.5°, 45° or 67.5° (the sum of 22.5°+45°) by the action of the bi-phase modulators 22 and 24 to enable the modulation of a carrier signal to any of 8 phase positions (evenly separated by 45°) or any of 16 phase positions (evenly separated by 22.5°) to generate the modulation constellations illustrated in FIGS. 1*c* and 1*d* for 8 PSK and 16 PSK.

Figure 1H:
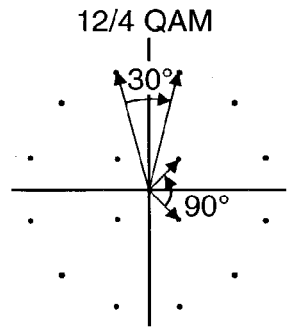
FIG. 1h is constellation diagram of a 12/4 QAM modulated signal.
Figure 4:
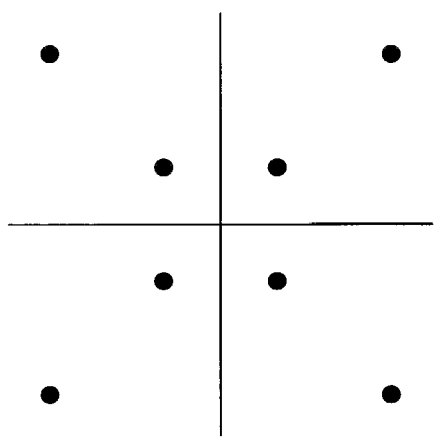
FIG. 4 illustrates selected points from the 16 QAM constellation to be used to form a 12/4 QAM constellation.
Figure 5:
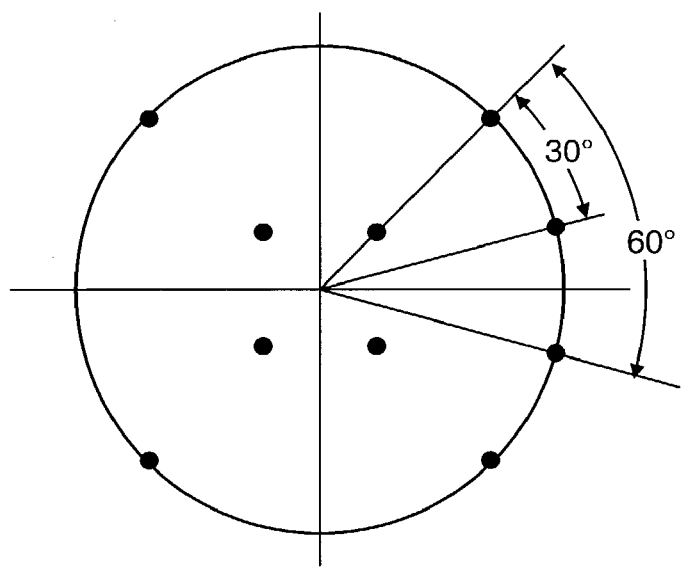
FIG. 5 illustrates the effects of rotating the outer 4 constellation points by 30° intervals to form the 12/4 QAM constellation.

The universal modulator 20 may also be used to form a 12/4 QAM constellation. In this configuration the switches 54, 56, 58, 60, 100, 102, 104 and 106 are configured as illustrated in FIG. 3. The switches 108 and 110 are configured in the opposite position to that shown in FIG. 3, thereby disabling the QPSK modulator 29. In this configuration, the QPSK modulators 26 and 28 generate a 16 QAM modulation constellation as shown in FIG. 2*b*. For generation of the 12/4 QAM constellation, only the 4 innermost and 4 outermost points are used as shown in bold in FIG. 4. The inner 4 points are evenly separated by 90° and form the inner circle of points in the 12/4 QAM constellation shown in FIG. 1*h*. The bi-phase modulators 22 and 24 are used to rotate the positions of the outer 4 points by either 0°, 30° or 60° as shown in FIG. 5. Each of the outer 4 points may be rotated to any of 3 angular positions allowing a total of 12 position equally separated by 30°, forming the outer ring of 12 constellation points shown in the 12/4 QAM constellation of FIG. 1*h*.

The variable attenuator 92 may be adjusted to control the relative amplitude between the four inner and twelve outer constellation points in the 12/4 QAM configuration. The variable phase shifter 96 may be adjusted to control the relative phase between the four inner and twelve outer constellation points in the 12/4 QAM configuration. These adjustments may be used to compensate for variations in power amplifier saturation characteristics, such as amplitude compression, known as AM to AM distortion and incidental phase modulation, known as AM to PM distortion.

Figure 6:
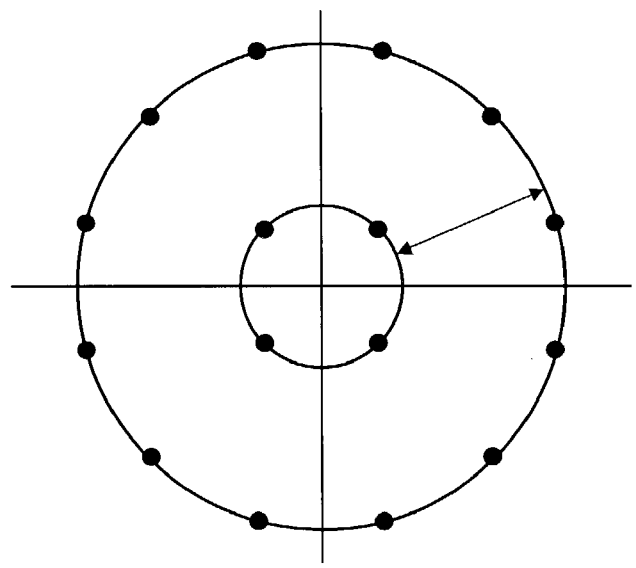
FIG. 6 illustrates the amplitude differential between the inner and outer ring of points on the 12/4 QAM constellation.

In most wideband data links, it is generally desirable to operate the power amplifiers close to saturation as possible to achieve optimum efficiency. Operation of the power amplifier at or near saturation results in undesirable suppression of the amplitude modulation portion of the QAM waveform. The technique illustrated in FIG. 6 thus allows the amplitude levels in the modulator to compensate for the amplitude compression.

Wideband data links performance is also frequently limited by non-linear effects, such as AM to PM (Amplitude Modulation to Phase Modulation) distortion. A well proven technique, known as non-linear predistortion, has been shown to successfully mitigate these effects. A capability to support non-linear predistortion may be incorporated into the universal modulator. The universal modulator as shown in FIG. 3 incorporates 2 bi-phase modulators that may be programmed to provide 0°, 22.5°, 30° or 45° phase shifts. Additional bi-phase modulators may be added that are programmed to generate progressively finer phase adjustments as desired. Typically a binary progression of 11.2°, 5.6°, 2.6° may be used. Additional bi-phase modulators may be added to achieve the fine degree of phase control desired. The combination of fine phase adjustments could be used to optimize data link performance by minimizing degradation due to AM to PM distortion.

Figure 7:
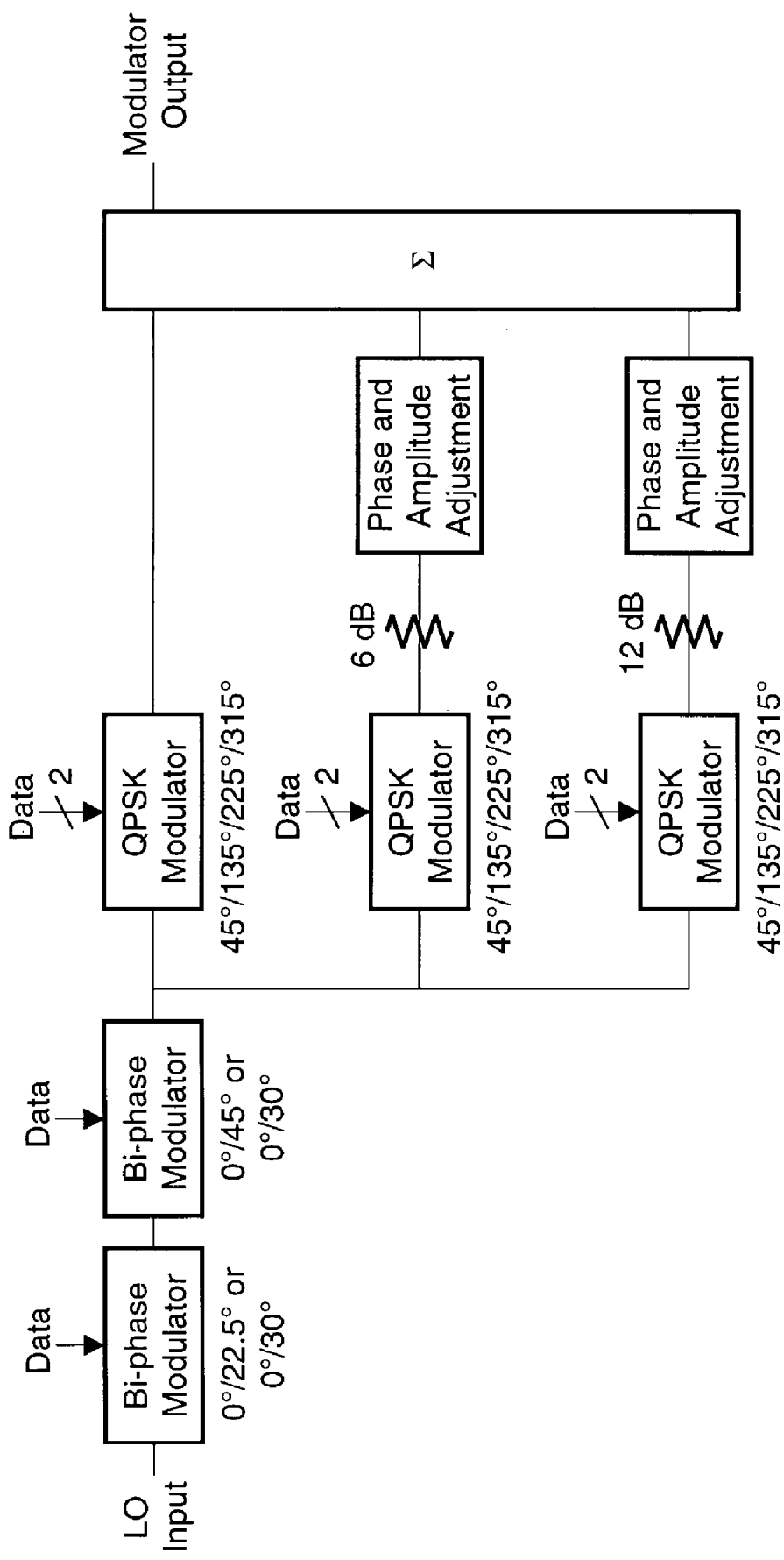
FIG. 7 is a high level block diagram of a universal modulator that supports QPSK, 8 PSK 16 PSK, 16 QAM, 32 QAM, 64 QAM and 12/4 QAM.
Figure 8:
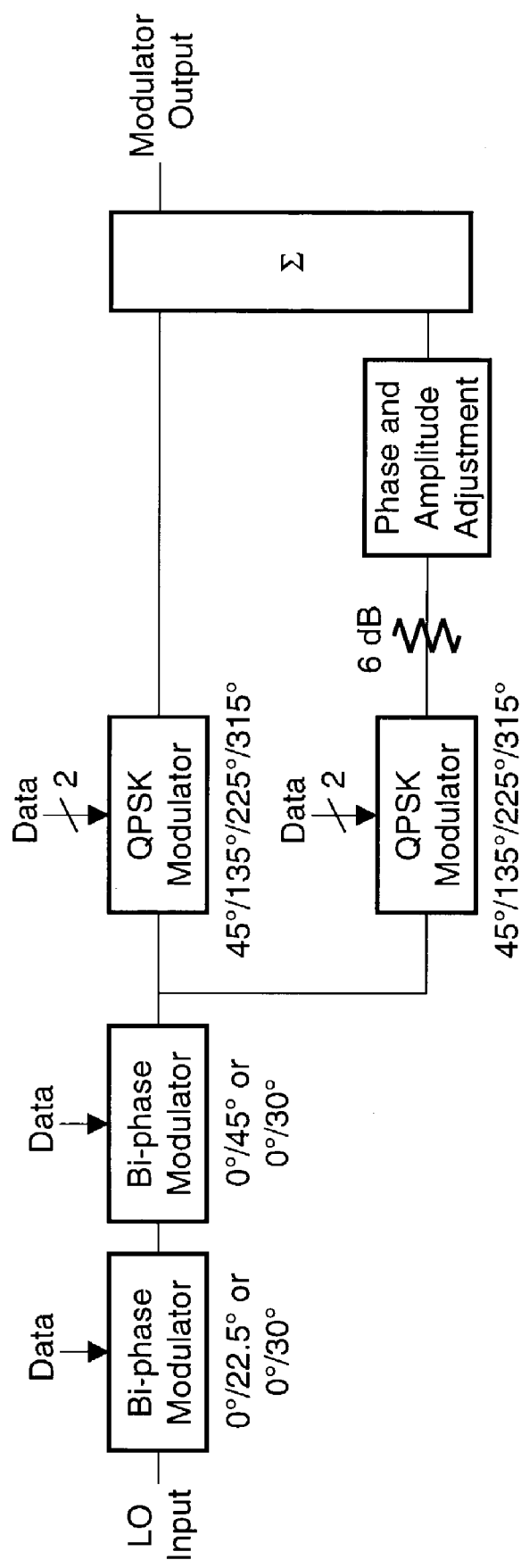
FIG. 8 is a high level block diagram of a simplified universal modulator architecture that supports QPSK, 8 PSK 16 PSK, 16 QAM and 12/4 QAM.

FIG. 7 illustrates a high level block diagram of a universal modulator that supports QPSK, 8 PSK, 16 PSK, 16 QAM, 32 QAM, 64 QAM and 12/4 QAM. FIG. 8 illustrates a high level block diagram for a universal modulator that supports QPSK, 8 PSK, 16 PSK, 16 QAM and 12/4 QAM. Simplification of the universal modulator is possible. If, for example, 32 QAM and 64 QAM are not required, QPSK modulator 29 may be omitted. In this case, the power divider 66 and the power combiner 68 would be 2-way devices instead of 3-way devices as shown in FIG. 3. Also the switches 108 and 110, terminations 120 and 122, and attenuator 71 would not be required.

Figure 9:
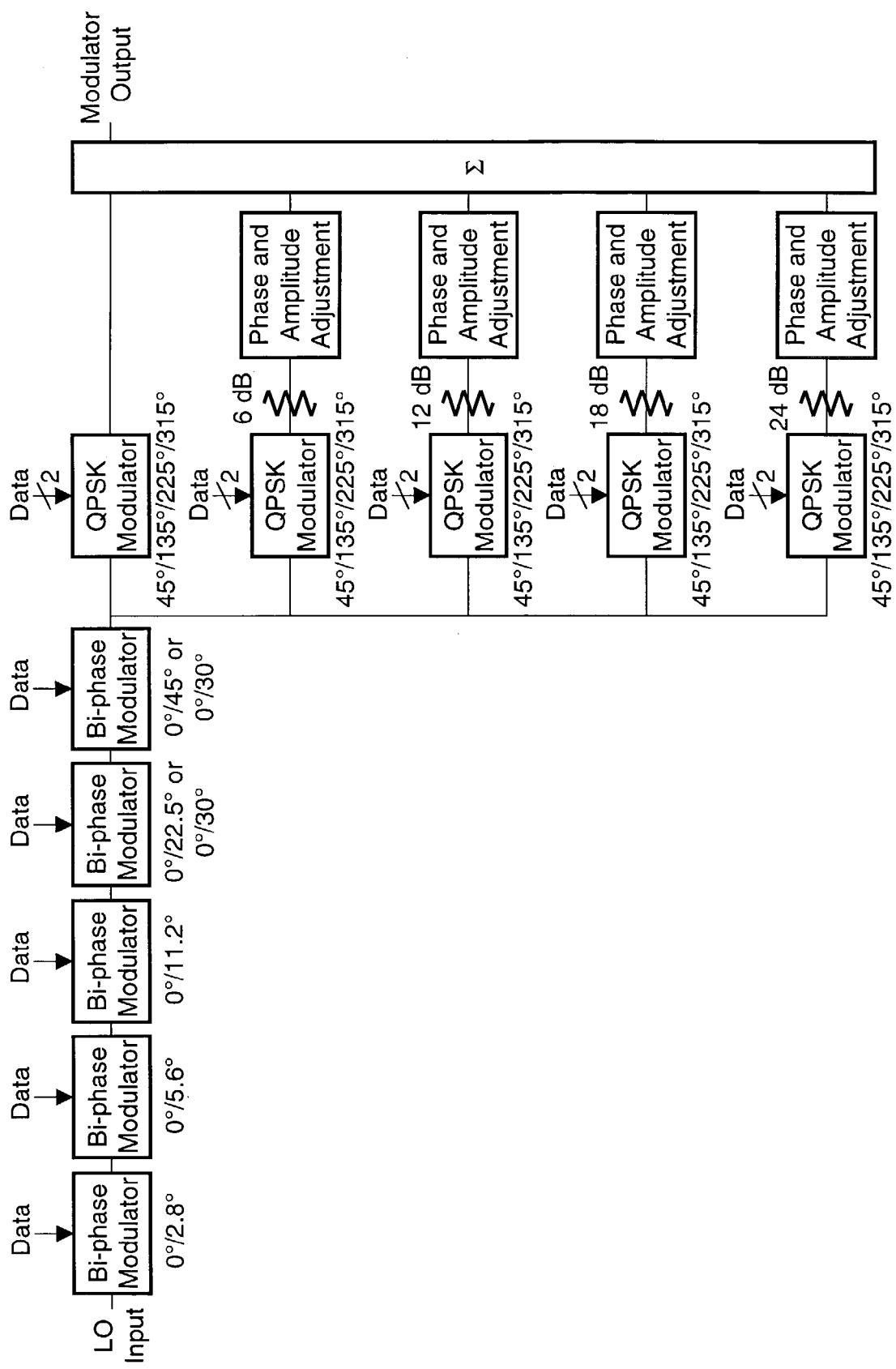
FIG. 9 is a high level block diagram of an enhanced universal modulator architecture that supports 256 QAM, 512 QAM, 1024 QAM and non-linear predistortion.

Conversely, additional QPSK modulator sections may be added to the basic universal modulator shown in FIG. 3 to support higher order modulation formats. FIG. 9 illustrates a high level block diagram of a universal modulator that additionally supports 256 QAM, 512 QAM and 1024 QAM.

Obviously, many modifications and variations of the present invention are possible in light of the above teachings. Thus, it is to be understood that, within the scope of the appended claims, the invention may be practiced otherwise than as specifically described above.

The invention claimed is:

1. A universal modulator comprising:
one or more biphase modulators;
one or more QPSK modulator serially coupled to said one or more biphase modulators,
wherein said universal modulator includes at least two pairs of parallel connected QPSK modulators.

2. The universal modulator as recited in claim 1, further including a first switch for selectively coupling one of said at least two parallel connected QPSK modulators to said one or more biphase modulators.

3. The universal modulators as recited in claim 2, further including a second switch for selectively coupling another of said at least two parallel connected QPSK modulators to said one or more biphase modulators.

4. The universal modulator comprising:
one or more biphase modulators;
one or more QPSK modulator serially coupled to said one or more biphase modulators,
wherein said universal modulator includes two biphase modulators defining a first biphase modulator and a second biphase modulator.

5. The universal modulator as recited in claim 4, wherein said two biphase modulators are serially coupled together.

6. The universal modulator as recited in claim 5, wherein said universal modulator includes three parallel connected QPSK modulators defining firm, second and third QPSK modulators.

7. The universal modulator as recited in claim 6, further including three switches for selectively connecting said first, second and third QPSK modulators so said two serially coupled biphase modulators.

8. The universal modulator as recited in claim 4, wherein said first biphase modulators includes a first 90.degree. phase shift device which receives an input for said biphase modulator.

9. The universal modulator as recited in claim 8, wherein said first biphase modulator includes a first mixer for mixing art output of said first phase shifting device with a selectable logic level, said first mixer having a first input connected to said first phase shifting device and in second input connected to said selectable logic level and an output.

10. The universal modulator as recited in claim 9, said first biphase modulator further includes a pair of first attenuators, connected in parallel by way of a pair of attenuator switches defining first and second attenuation levels for selectively coupling one or the other of said pair of first attenuators to said output of said first mixer.

11. The universal modulator as recited in claim 10, further including a first summing junction coupled between said first phase shifting device and said pair of first alternators, said first summing junction having a first output terminal.

12. The universal modulator as recited in claim 11, wherein said second biphase modulator includes a second 90.degree. phase shifting device having a second input coupled to the first output of said first summing junction and two second outputs, a second summing junction coupled to one of said inputs of said second 90.degree. phase shifting device and a second sunning junction having two second inputs and a second output, one of said second inputs of second summing junction, and a pair of second attenuators coupled between said second mixer and said second summary junction, said second attenuators having third and fourth attenuation levels and including a second pair of attenuator switches for selectively coupling said pair of second attenuators to one of said second output for said second 900 phase shifting device.

13. The universal modulator as recited in claim 12, wherein said first, second, third and fourth attenuator levels are selected to provide either 0.degree., 30.degree. and 60degree. or 0.degree., 22.5.degree., 45.degree. and 67.5.degree. total phase shifts.

14. A universal modulator for generating a plurality of band efficient signals, the universal modulator comprising:
QPSK generating means for generating a quadrature phase shift keying (QPSK) signals; and
QAM generating means for generating quadrature amplitude modulation (QAM) signals.

15. The universal modulator as recited in claim 14, wherein said QPSK, generating means includes means for generating 8 PSK signals.

16. The universal modulator as recited in claim 14, wherein said QPSK generating means includes means for generating 16 PSK signals.

17. The universal modulator as recited in claim 14, wherein said QSPK generating means includes means for selectively generating 8 PSK and 16 PSK signals.

18. The universal modulator as recited in claim 14, wherein said QAM generating means includes means for generating 16 QAM signals.

19. The universal modulator as recited in claim 14, wherein said QAM generating means includes means for generating 12/4 QAM signals.

20. The universal modulator as recited in claim 14, further including means for compensation of power amplifier distortion, such as AM to AM and AM to PM.

21. The universal modulator as recited in claim 14, wherein said QAM generating means includes means for selectively generating 16 QAM and 12/4 QAM signals.

22. The universal modulator as recited in claim 14, wherein said QPSK generating means includes means for selectively generating 8 PSK and 16 PSK signals and said QAM generating means includes means for selectively generating 16 QAM and 12/4 QAM signals.

23. The universal modulator as recited in claim 14, wherein said QPSK generating means includes means for selectively generating a plurality of QPSK signals.

24. The universal modulator as recited in claim 14, wherein said QAM generating means includes means for selectively generating a plurality of QAM signals.

25. The universal modulator as recited in claim 14, wherein said QPSK generating means includes means for selectively generating a plurality of QPSK signals and said QAM generating means includes means for selectively generating a plurality of QAM signals.

26. The universal modulator as recited in claim 23, wherein said means for generating a plurality of QPSK signals includes a plurality of parallel modulators and a series modulator.

27. The universal modulator as recited in claim 23, wherein said means for generating a plurality QPSK signals includes a plurality of parallel modulators and a plurality of series modulators.

28. The universal modulator as recited in claim 23, wherein said means for generating a plurality of QAM signals includes a plurality of series modulators and a plurality of parallel modulators.

29. A universal modulator comprising:

one or more biphase modulators; and a plurality of QPSK modulators, serially coupled to said one or more biphase modulators, said plurality selected to generate 256 QAM.

30. A universal modulator comprising:

one or more biphase modulators; and a plurality of QPSK modulators, serially coupled to said one or more biphase modulators, said plurality selected to generate 512 QAM.

31. A universal modulator comprising:

one or more biphase modulators; and a plurality of QPSK modulators, serially coupled to said one or more biphase modulators, said plurality selected so generate 1024 or higher QAM.

* * * * *

UNITED STATES PATENT AND TRADEMARK OFFICE
CERTIFICATE OF CORRECTION

| | |
|---|---|
| PATENT NO. | : 7,138,882 B2 |
| APPLICATION NO. | : 10/291159 |
| DATED | : November 21, 2006 |
| INVENTOR(S) | : James C. Becker |

It is certified that error appears in the above-identified patent and that said Letters Patent is hereby corrected as shown below:

On the Title page, (73), please add: --Assignee: Northrop Grumman Corporation, Los Angeles, CA--

Signed and Sealed this

Seventh Day of August, 2007

JON W. DUDAS
*Director of the United States Patent and Trademark Office*